United States Patent
Lee (10) Patent No.: US 8,035,918 B2
(45) Date of Patent: Oct. 11, 2011

(54) SPINDLE MOTOR HUB, DISK PACK, AND HARD DISK DRIVE HAVING THE SAME

(75) Inventor: Hong Kwon Lee, Seongnam-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 932 days.

(21) Appl. No.: 12/018,349

(22) Filed: Jan. 23, 2008

(65) Prior Publication Data

US 2008/0180837 A1  Jul. 31, 2008

(30) Foreign Application Priority Data

Jan. 29, 2007  (KR) .................. 10-2007-0008800

(51) Int. Cl.
*G11B 17/038* (2006.01)
(52) U.S. Cl. ............... 360/98.08; 360/99.12; 369/270.1
(58) Field of Classification Search .............. 360/98.08, 360/99.12; 369/270.1
See application file for complete search history.

(56) References Cited

U.S. PATENT DOCUMENTS

| | | | |
|---|---|---|---|
| 5,657,311 A | 8/1997 | Takahashi | |
| 5,917,677 A * | 6/1999 | Moir et al. | 360/99.12 |
| 6,222,700 B1 * | 4/2001 | Martin et al. | 360/98.08 |
| 6,292,461 B1 | 9/2001 | Kikuchi et al. | |
| 2002/0054454 A1 * | 5/2002 | Chen et al. | 360/99.12 |
| 2003/0174440 A1 * | 9/2003 | Kloeppel et al. | 360/99.12 |
| 2007/0058292 A1 * | 3/2007 | Choi et al. | 360/99.12 |

* cited by examiner

*Primary Examiner* — Angel A. Castro
(74) *Attorney, Agent, or Firm* — Volentine & Whitt, PLLC (57) ABSTRACT

A spindle motor includes a spindle motor hub that supports one or more disks, and has a contact area reduction portion that minimizes the area of contact between the hub and a disk when the disk is mounted to the hub. The spindle motor hub includes a hub body having a cylindrical sidewall that includes a contact section around which the disk extends and a non-contact section. The non-contact section is constituted by the contact area reduction portion. An outer diameter of the cylindrical hub body at the contact section is greater than an outer diameter of the cylindrical hub body at the contact area reduction portion of the non-contact section.

22 Claims, 7 Drawing Sheets

SPINDLE MOTOR HUB, DISK PACK, AND HARD DISK DRIVE HAVING THE SAME

BACKGROUND OF THE INVENTION

1. Field of the Invention

The present invention relates to a hard disk drive. More particularly, the present invention relates to a disk pack of a hard disk drive which includes a spindle motor hub and disks mounted to the spindle motor hub.

2. Description of the Related Art

Hard disk drives (HDDs) are memory devices which record and reproduce data by converting digital electric pulses to a magnetic field and vice versa. To this end, a hard disk drive includes at least one disk having a number of tracks along which data is recorded, a spindle motor for rotating each disk, a read/write head which can write magnetic data onto the disk and read magnetic data from the disk, and an actuator arm for positioning the head above a particular track of the disk and maintaining the read/write head a predetermined height above the disk while the head is reading or writing data from or onto the disk. With such components, HDDs can access a large amount of data quickly. Therefore, HDDs have been widely used as auxiliary memory devices of computer systems.

Recent advances in the fabrication of hard disks have increased the number of TPI (tracks per inch) and BPI (bits per inch; a measure of the amount of data that can be recorded along a track). That is, recent advances have increased the capacity of HDDs so that HDDs can be made more compact and therefore, can be employed in a wider range of devices. In particular, there is a large demand for compact HDDs which can be used in portable electronic devices such as notebooks, personal digital assistants (PDAs), and mobile phones. In fact, a compact HDD whose disk has a diameter of 0.8 inches, i.e., a diameter similar to that of a coin, has been recently developed for use in mobile phones.

As briefly mentioned above, the disk is rotated by a spindle motor when the HDD is operating. Therefore, vibrations are generated due to the rotation of a disk. These vibrations must be attenuated to ensure that the HDD operates reliably and at full capacity. Problems related to disk vibrations will now be discussed below with reference to a conventional HDD shown in FIG. 1. The conventional HDD has two disks 111 and 112 coupled to a spindle motor. Also, an annular spacer 114 is disposed on the spindle motor hub 120 between the disks 111 and 112. A clamp (not shown) is disposed the spindle motor hub 120 and the second disk 112. The clamp is secured by a screw (also not shown) onto the spindle motor hub 120 so as to press down against the upper surface of the second disk 112 and thereby clamp the disks 111 and 112 to a flange of the spindle motor hub 120. Therefore, the disks 111 and 112 rotate together with the spindle motor hub 120 during the operation of the HDD.

Figure 1:
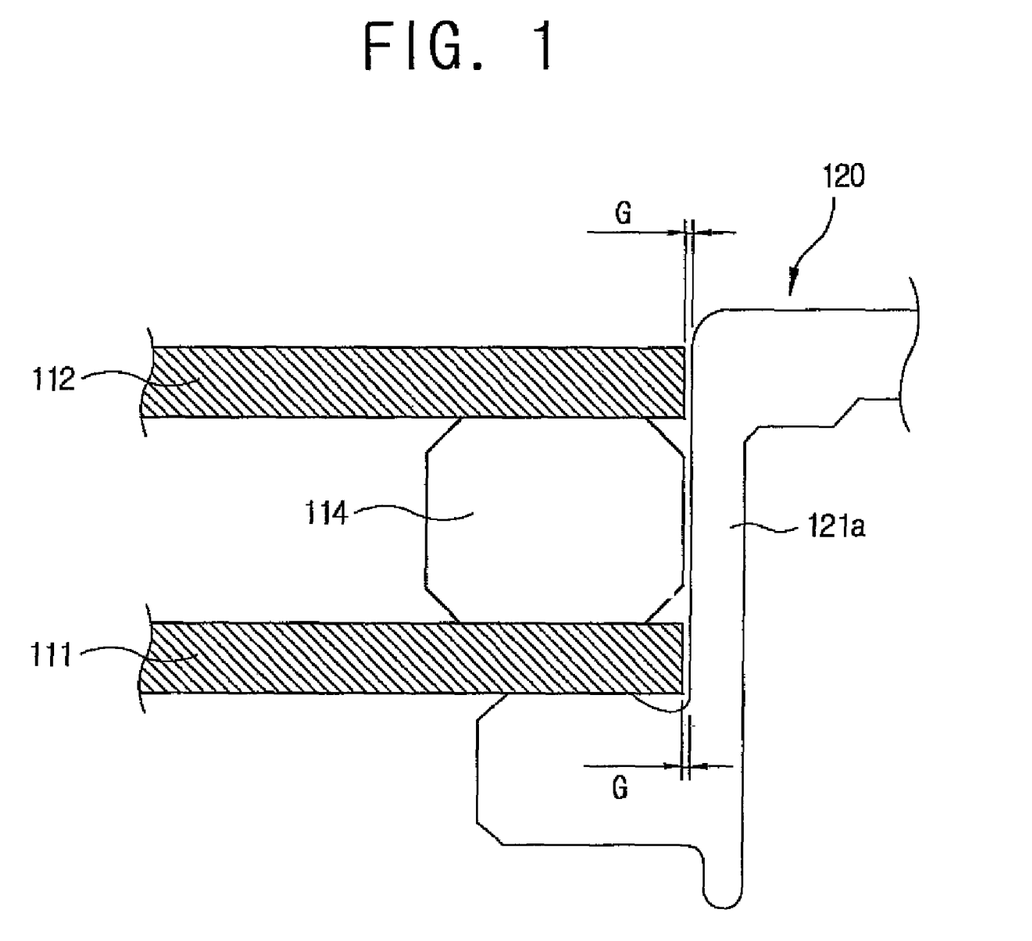
FIG. 1 is a sectional view of part of a disk pack of a conventional hard disk drive.

In the conventional HDD, however, a gap G is present between the disks 111 and 112 and a side wall 121a of the spindle motor hub 120 due to the tolerance provided to facilitate the mounting of the disks 11 and 112 onto the spindle motor hub 120. The gap G prevents at least one of the disks 111 and 112 from rotating at a constant speed because, for example, the disk rotates while inclined relative to the axis of rotation. As a result, vibrations are produced at one side of the disk during its rotation.

It is relatively easy to mount the disks 111 and 112 to the spindle motor hub 120 when the gap G is large, i.e., when the inner diameter of each of the disks 111 and 112 is much larger than that of the spindle motor hub 120. In this case, however, the rotation of the disks 111 and 112 becomes severely eccentric relative to the axis of rotation of the spindle motor hub 120. As a result, the disks 111 and 112 vibrate excessively, thereby preventing the HDD from functioning properly. Tightening the screw that secures the clamp to the spindle motor hub 120 can obviate this potential problem. However, if the clamp screw is tightened too much, the inner circumferential (ID) portion of each of the disks 111 and 112 is pressed hard against the side wall 121a of the spindle motor hub 120. In this case, the ID portion of each of the disks 111 and 112 is likely to warp, thereby reducing the capacity and reliability of the HDD.

Thus, the gap G should be as small as possible to ensure that the disks 111 and 112 will rotate smoothly with the spindle motor hub 120. That is, the inner diameter of each of the disks 111 and 112 should be matched as close as possible to the outer diameter of the upper end portion of the spindle motor hub 120. However, such tight tolerances compromise the ability of the disks 111 and 112 to be mounted to the spindle motor hub 120. In particular, the first disk 111 may scratch the side wall 121a of the spindle motor hub 120 as the first disk 111 is lowered onto the upper portion of the spindle motor hub 120. In this case, particles are generated which causes other problems in the HDD.

SUMMARY OF THE INVENTION

An object of the present invention is to provide a spindle motor hub that will prevent particles from being produced when one or more disks are mounted thereto. Similarly, another object of the present invention is to provide a disk pack that will prevent particles from being produced when the disk pack is assembled.

Another object of the present invention is to provide a disk pack whose disk or disks will rotate smoothly and can be used to their full capacity, and which is highly shock resistant.

Another aspect of the present invention is to provide a highly reliable hard disk drive.

According to an aspect of the present invention, there is provided a spindle motor hub having a contact area reduction portion that minimizes a contact area with a disk when the disk is inserted onto the spindle motor hub.

According to another aspect of the present invention, there is provided a disk pack comprising one or more disks, a spindle motor hub supporting the disk(s), and a clamp clamping the disk(s) to the spindle motor hub, wherein the spindle motor hub has a contact area reduction portion that minimizes a contact area with a disk when the disk is inserted onto the spindle motor hub. The disk pack may also have a clamp screw that fixes the clamp to the spindle motor hub.

According to another aspect of the present invention, there is provided a hard disk drive comprising a base, a head stack assembly (HSA) including a swing arm supported on the base so as to be rotatable about an axis of rotation, and a magnetic head supported by the swing arm, a voice coil motor (VCM) that rotates the swing arm, at least one disk, and a spindle motor that rotates the disk about an axis of rotation, wherein the spindle motor is mounted to the base and includes a spindle motor hub having a contact area reduction portion that minimizes a contact area with a disk when the disk is inserted onto the spindle motor hub.

According to the present invention, the spindle motor hub comprises a hub body having a cylindrical side wall whose central longitudinal axis coincides with the axis of rotation for the disk. The cylindrical side wall has a contact section which will confront the disk and around which the disk will extend when the disk is supported by the hub, and a non-contact section located between the contact section and the upper wall in the axial direction of the cylindrical side wall. The non-contact section includes the contact area reduction portion. The contact area reduction portion may extend over the entirety of the non-contact section. An outer diameter of the cylindrical hub body as taken at the contact section is substantially greater than an outer diameter of the hub body as taken at the contact area reduction portion of the non-contact section. The maximum outer diameter of the hub body may be located at the contact section and the minimum outer diameter of the hub body may be located at the non-contact section.

The spindle motor hub may also have a flange extending radially outwardly from a lower end portion of the hub body. Also, the hub body may have an upper wall and a bevel between the cylindrical side wall and the upper wall, i.e. the hub body may have a beveled upper corner.

Preferably, the spindle motor hub is for supporting two or more disks of a hard disk drive. In this case, the cylindrical side wall of the hub body has a plurality of contact sections around which the disks extend, respectively, when the disks are supported by the hub. The non-contact section is located between adjacent ones of the contact sections. The non-contact section may extend over the entirety of the side wall of the hub body with the exception of the contact sections.

The contact area reduction portion may define an indentation in the side wall of the hub body. The sectional profile of the indentation may be substantially in the shape of a segment of a circle.

BRIEF DESCRIPTION OF THE DRAWINGS

The above and/or other objects, aspects and advantages of the present invention will become apparent and more readily appreciated from the following detailed description, taken in conjunction with the accompanying drawings of which.

DETAILED DESCRIPTION OF THE PREFERRED EMBODIMENTS

The present invention will now be described in more detail with reference to FIGS. 2-7. Note, like reference numerals are used to designate like elements throughout the drawings.

Referring first to FIGS. 2 to 6, an embodiment of an HDD according to the present invention includes a disk pack 1 (FIG. 2) having a spindle motor 10 (FIG. 3) and first and second disks 11 and 12 mounted to the spindle motor, a head stack assembly (HSA) 40 for reading data from and recording data onto the first and second disks 11 and 12, a base 52 to which components of the HDD including the spindle motor 10 and HSA 40 are mounted, a printed circuit board assembly (PCBA) 50 coupled to the bottom of the base 52, and a cover 54 coupled to and covering the base 52.

Figure 2:
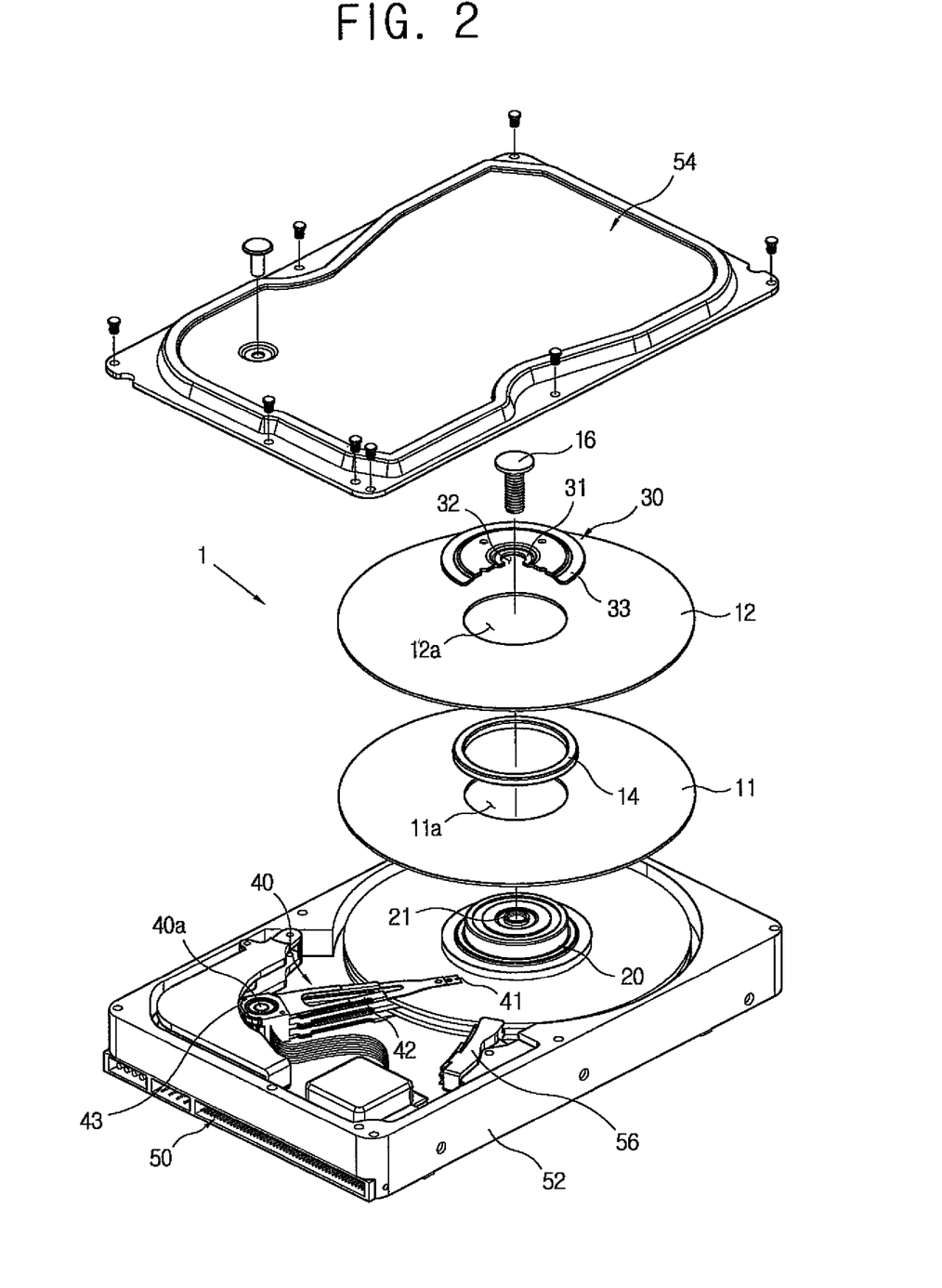
FIG. 2 is a partially exploded perspective view of a hard disk drive according to the present invention.
Figure 3:
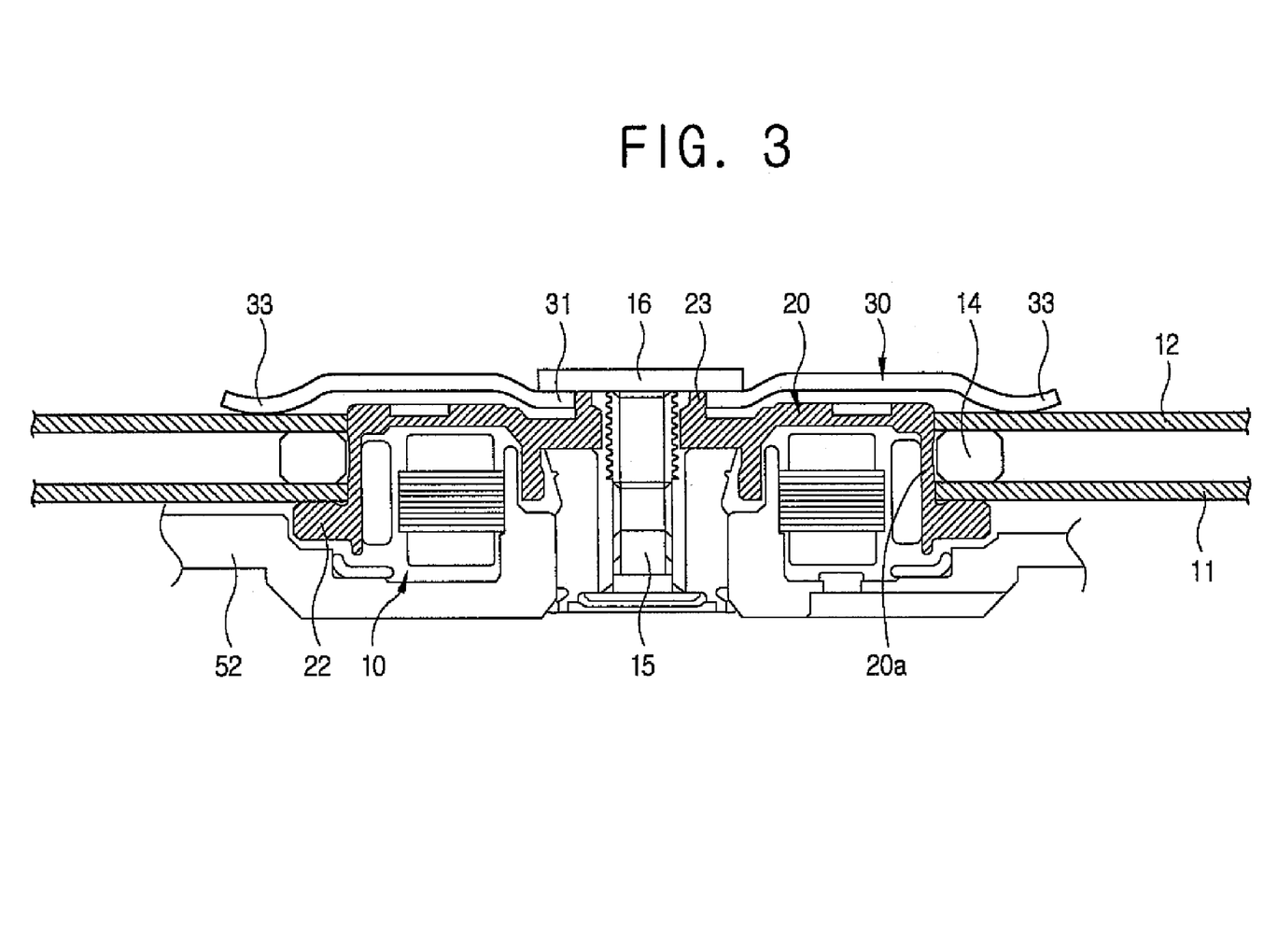
FIG. 3 is a sectional view of a disk pack of the hard disk drive according to the present invention.

The HSA 40 includes magnetic heads 41 for reading or writing data from or onto each of the first and second disks 11 and 12, an actuator arm 42 to which the magnetic heads 41 are attached, and a pivot shaft holder 43 integral with the actuator arm 42. The pivot shaft holder 43 is supported by a pivot shaft 40a such that the actuator arm 42 is rotatable about a central longitudinal axis of the pivot shaft 40a. Thus, as will be described in more detail below, the actuator arm 42 can position the magnetic heads 41 over the disks 11 and 12 so that the magnetic heads 41 can access data recorded on the first and second disks 11 and 12 or have access to the recording surfaces of the disks 11 and 12 so that data can be written onto the disks 11 and 12. The HSA 40 also includes a bobbin (not shown) provided on the actuator arm 42 at a side thereof opposite that at which the magnetic heads 41 are provided with respect to the pivot shaft holder 43. The bobbin is located between magnets (not shown) of a voice coil motor (VCM). A voice coil (not shown) is wound around the bobbin.

The VCM rotates the actuator arm 42 according to Fleming's left hand rule, namely, the rule that states that a force is exerted on a conductor in a magnetic field when current flows through the conductor. In the HDD, an electromotive force is exerted on the bobbin when current is supplied to the voice coil because the voice coil is located between the magnets and is attached to the bobbin. Accordingly, the actuator arm 42, which is integral with the bobbin, is rotated when current is supplied to the voice coil. In this respect, the printed circuit board assembly (PCBA) 50 coupled to the bottom of the base 52 controls, among other things, the supply of current to the voice coil.

Although not illustrated in detail, the actuator arm 42 has a respective suspension that supports each magnetic head 41, and an end tab is formed at an end of the suspension. The suspension biases the magnetic head 41 toward the recording surface of one of the disks 11 and 12 during a read/write operation in which the disks 11 and 12 are rotating. When the power to the HDD is turned off and the first and second disks 11 and 12 stop rotating, the actuator arm 42 is rotated such that the end tab is slid onto a ramp 56 to park the magnetic head 41. Thus, the magnetic head 41 is prevented from contacting the recording surface of the disk when the HDD is not in use. The parking of a magnetic head in this way is referred to as a ramp loading method.

Figure 4:
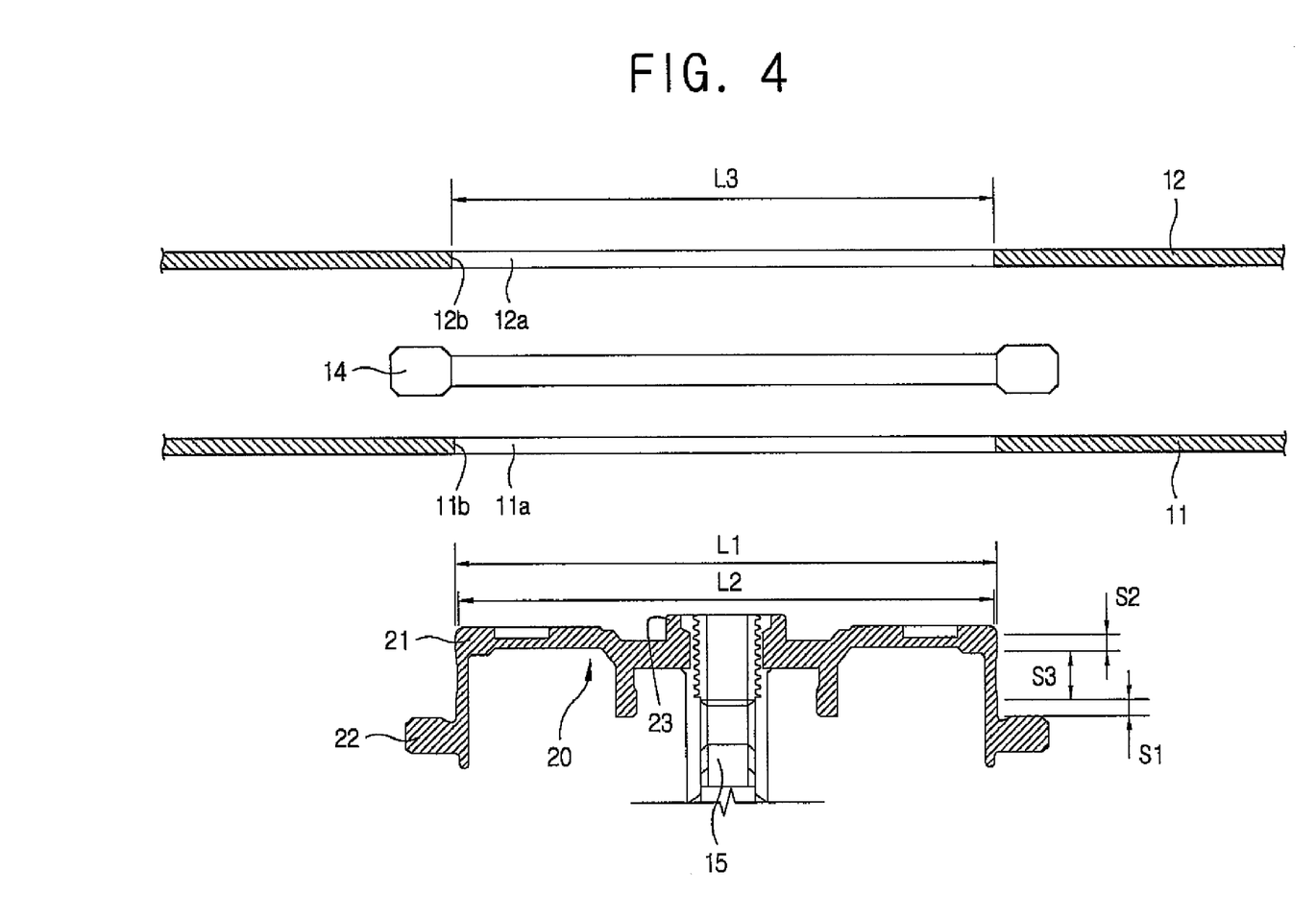
FIG. 4 is an exploded sectional view of part of the disk pack according to the present invention.

The spindle motor 10 of the disk pack 1 includes a shaft 15 forming the axis of rotation for the first and second disks 11 and 12, and a spindle motor hub 20 surrounding the shaft 15 and supporting the first and second disks 11 and 12. As shown in FIG. 4, the spindle motor hub 20 includes a cylindrical hub body 21, a flange 22 extending radially outwardly from the lower portion of the hub body 21, and a boss 23 protruding upward from the hub body 21. The spindle motor 10 also includes a clamp 30 extending around the boss 23 of the spindle motor hub 20 and over an upper portion of the second disk 12, and a clamp screw 16. The clamp screw 16 fixes the clamp 30 to the spindle motor hub 20 such that the clamp 30, in turn, clamps the first and second disks 11 and 12 to the flange 22 of the spindle motor hub 20. The spindle motor 10 also includes an annular spacer 14 interposed between the first and second disks 11 and 12 to keep the first and second disks 11 and 12 separated from each other. However, the HDD according to the present invention may have only one disk. In this case, the spacer 14 is omitted.

Referring again to FIG. 2, the first and second disks 11 and 12 have first and second through-holes 11a and 12a, respectively, through which the hub body 21 of the spindle motor hub 20 extends. The flange 22 of the spindle motor hub 20 contacts the bottom surface of and supports the first disk 11.

The spindle motor hub 120 may, however, have features other than the flange 22 for supporting the first disk 11. In any case, the spacer 14 sits on the first disk 11, and the second disk 12 sits on the spacer 14. The clamp 30, on the other hand, defines an opening 32 through which the boss 23 of the spindle motor hub 20 extends. The clamp 30 has an outer peripheral portion 33 that contacts the second disk 12 and an inner peripheral portion 31 that contacts the boss 23.

Figure 5:
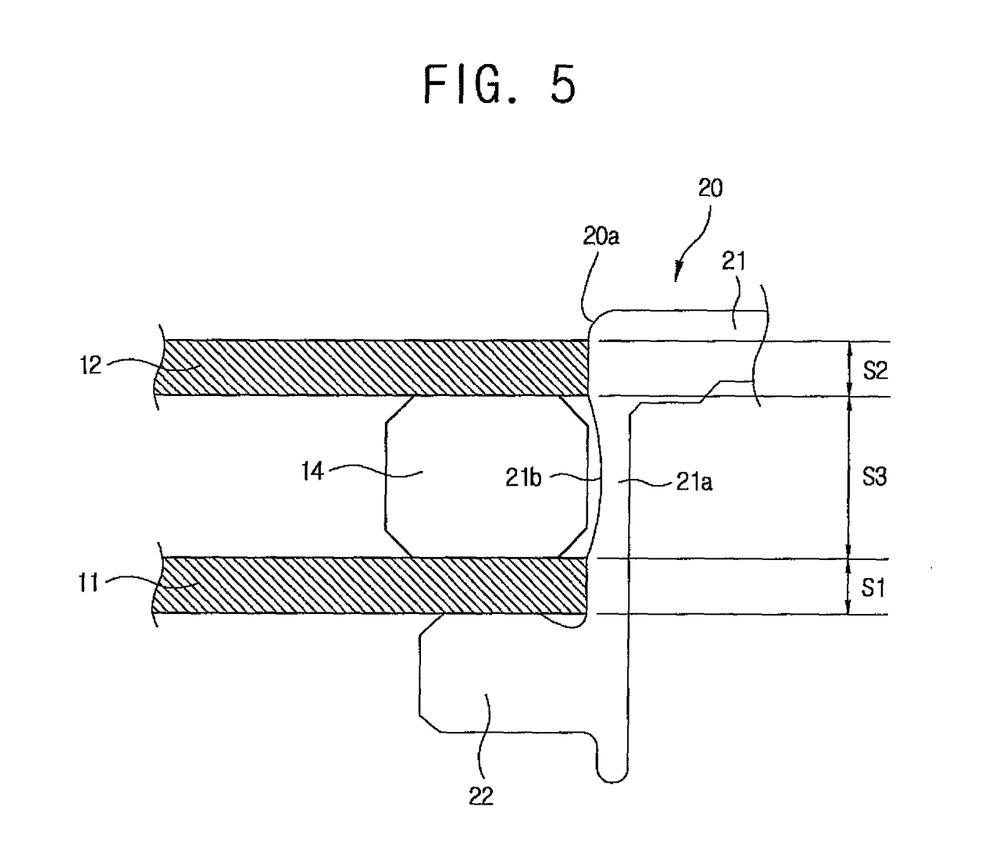
FIG. 5 is a sectional view of part of the disk pack of the hard disk drive according to the present invention.
Figure 6:
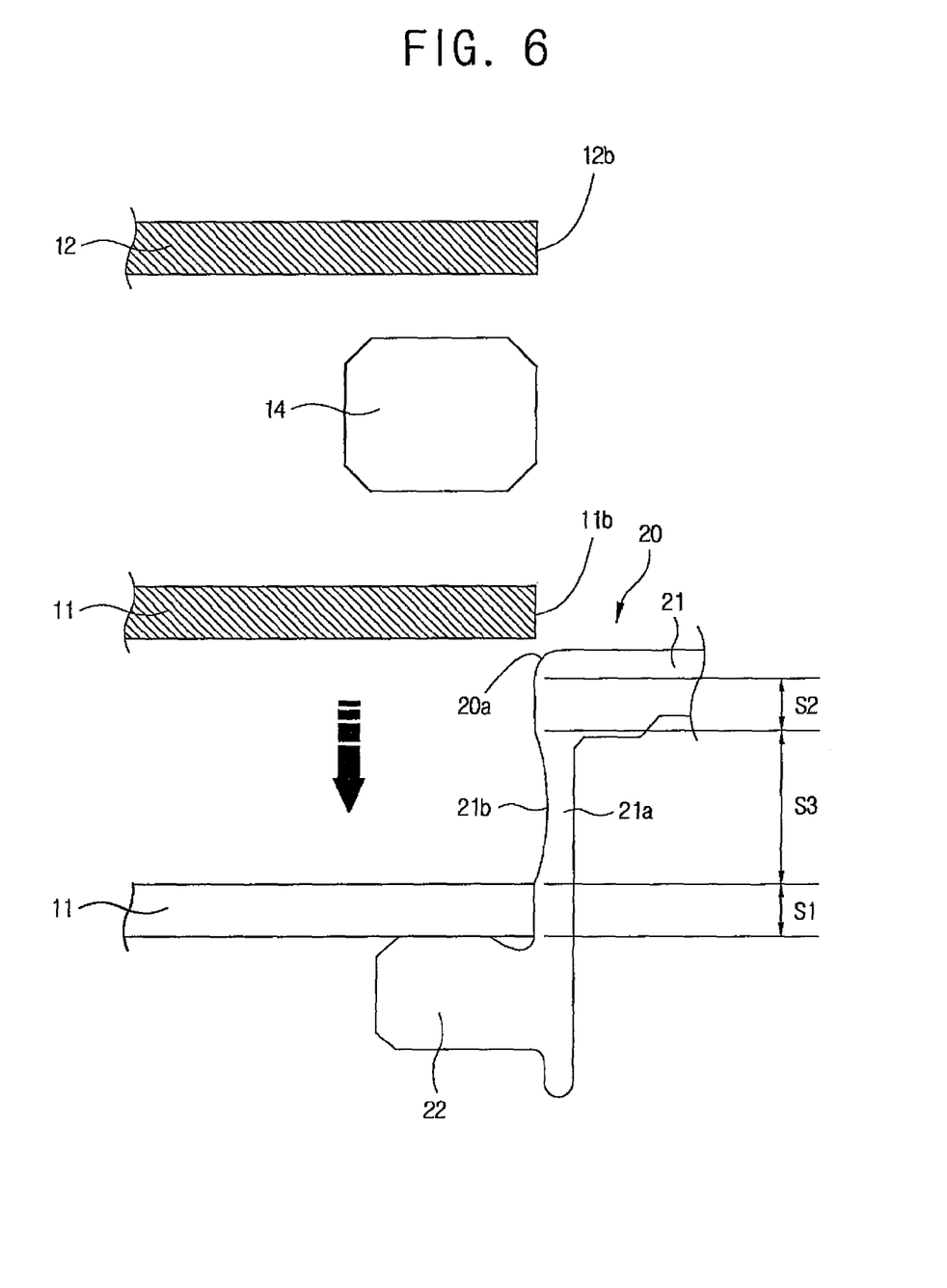
FIG. 6 is an exploded sectional view of the part of the disk pack shown in FIG. 5.
Figure 7:
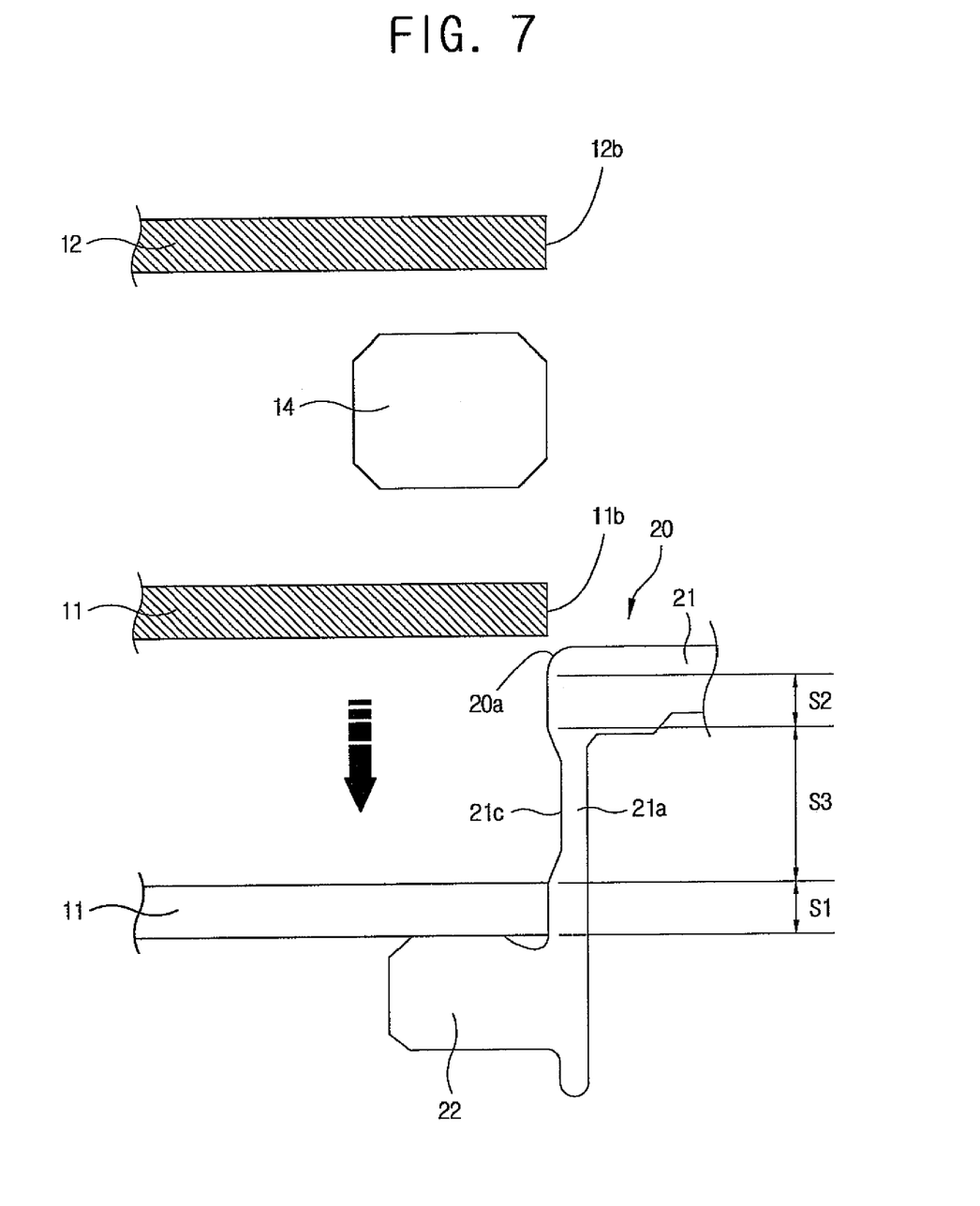
FIG. 7 is an exploded sectional view of the part of another embodiment of a disk pack of a hard disk drive according to the present invention.

As best shown in FIGS. 4 through 6, the side wall 21a of the hub body 21 around which the first and second disks 11 and 12 extend has a contact area reduction portion 21b which minimizes the area of contact between the hub body 21 and the first disk 11 when the first disk 11 is mounted to the spindle motor hub 20. More specifically, the hub body 21 has first and second contact sections S1 and S2, and a non-contact section S3 including the contact area reduction portion 21b. The first and second contact sections S1 and S2 confront inner peripheral edges 11b and 12b of the first and second disks 11 and 12 when the first and second disks 11 and 12 are mounted to the spindle motor hub 20. The non-contact section S3 of the hub body 21 is located between the first and second contact sections S1 and S2 and confronts the spacer 14. The hub body 21 also has a bevel 20a between the side wall 21a and an upper wall thereof, i.e., along the upper corner of the hub body 21. The bevel 20a serves as a guide for the first and second disks 11 and 12 such that the first and second disks 11 and 12 can be easily inserted onto the hub body 21.

The hub body 21 has a maximum outer diameter L1 (please refer to FIG. 4) at the first and second contact sections S1 and S2. Also, the maximum outer diameter L1 of the hub body 21 is substantially the same as (equal or slightly greater than) the diameter L3 of the first and second through-holes 11a and 12a of the first and second disks 11 and 12. Preferably, the maximum outer diameter L1 of the hub body 21 is no more than 0.50 mm greater than the diameter L3 of the first and second through holes 11a and 12a. Accordingly, a gap of 0.25 mm or less is present between each of the first and second contact sections S1 and S2 and the inner peripheral edges 11b and 12b of the first and second disks 11 and 12, respectively.

The non-contact section S3 has an outer diameter, as taken at contact area reduction portion 21b, that is less than the outer diameter L1 of the first and second contact sections S1 and S2. That is, the outer diameter of the non-contact section S3 of the hub body 21, as taken at the contact area reduction portion 21b, is less than the maximum outer diameter of the hub body 21. Also, the contact area reduction portion 21b preferably extends over the entire non-contact section S3 of the hub body 21. However, the present invention is not so limited as the contact area reduction portion 21b may extend over only part of the non-contact section S3.

In any case, according to the present invention, the contact area reduction portion 21b of the side wall 21a of the hub body 21 does not contact the first and second disks 11 and 12 when the disks 11 and 12 are placed on the spindle motor hub 20 during the assembling of the disk pack 1. More specifically, the contact area reduction portion 21b of the side wall 21a of the hub body 21 does not contact the inner peripheral edge 11b of the first disk 11 when the disk 11 is placed on the spindle motor hub 20 during the assembling of the disk pack 1. The first disk 11 only comes close to the second contact section S2 when the first disk 11 is set in place around the first contact section S1 of the first hub body 21. On the other hand, the first disk 11 can be easily passed over the non-contact section S3 of the hub body 21, due to the presence of the contact area reduction portion 21b, when the first disk 11 is set in place around the first contact section S1 of the first hub body 21. Therefore, the possibility of particles being produced while the first disk 11 is being placed on the hub body 21 is minimized.

The contact area reduction portion 21b has the form of an indentation in the side wall 21a of the hub body 21. In the embodiment of FIG. 6, the indentation defined by the contact area reduction portion 21b has a sectional profile which is in the form of a concavity. More specifically, the sectional profile of the outer surface of the contact area reduction portion 21b is curvilinear and arcuate or substantially arcuate. However, the present invention is not so limited as the indentation defined by the contact area reduction portion 21b may have other shapes in section. For example, in the embodiment shown in FIG. 7, the indentation defined by the contact area reduction portion 21b has a sectional profile in the form of a trapezoid. In any case, the hub body 21 has a minimum outer diameter L2 at the contact area reduction portion 21b, and the contact area reduction portion 21b constitutes at least part of the non-contact section S3.

As described above, the present invention minimizes the amount of particles generated during the assembly of the disk pack, i.e., while a disk or disks are mounted to the spindle motor hub. Also, the disks 11 and 12 are not prone to slipping relative to the spindle motor hub and yet, can be clamped to the hub without an excessive force. Therefore, an HDD and disk pack according to the present invention is highly shock resistant. In addition, the disk(s) will rotate smoothly and may be used to their full capacity. Therefore, the present invention also offers improvements in the capacity and reliability of an HDD as a memory device.

Finally, although the present invention has been shown and described in connection with the preferred embodiments thereof, the present invention is not limited to such embodiments. For example, the HDD according to the present invention has been described as having a disk pack of one or two disks. However, the present invention can be applied to an HDD having a disk pack of three or more disks. Also, although an HDD according to the present invention has been described as having a ramp parking system, the present invention can also be applied to an HDD having a contact start stop (CSS) type of parking system which is known in the art per se. Therefore, changes may be made to the disclosed embodiments without departing from the true spirit and scope of the invention as defined by the claims.

What is claimed is:

1. A spindle motor hub for supporting at least one disk of a hard disk drive, the spindle motor hub comprising a hub body having a cylindrical side wall whose central longitudinal axis coincides with the axis of rotation for the at least one disk, the cylindrical side wall having a contact section which will confront a disk and around which the disk will extend when the disk is supported by the hub, and a non-contact section located between the contact section and the upper wall in the axial direction of the cylindrical side wall, the non-contact section including a contact area reduction portion, and wherein an outer diameter of the cylindrical hub body as taken at the contact section is substantially greater than an outer diameter of the hub body as taken at the contact area reduction portion of the non-contact section.

2. The spindle motor hub of claim 1, further comprising a flange extending radially outwardly from a lower end portion of the hub body.

3. The spindle motor hub of claim 1 for supporting at least two disks of a hard disk drive, wherein the cylindrical side wall of the hub body has a plurality of contact sections around which disks extend, respectively, when the disks are supported by the hub, the non-contact section located between adjacent ones of the contact sections, and outer diameters of the cylindrical hub body as taken at the contact sections are each greater than an outer diameter of the hub body as taken along the contact area reduction portion of the non-contact section.

4. The spindle motor hub of claim 3, wherein the non-contact section of the side wall of the hub body spans the adjacent ones of the contact sections of the side wall of the hub body, and the contact area reduction portion extends over the entire non-contact section so as to also span the adjacent ones of the contact sections of the side wall of the hub body, whereby the outers diameter of the side wall of the hub body as taken at the contact sections are each greater than the outer diameter of the cylindrical hub body as taken at any location along the non-contact section of the side wall of the hub body.

5. The spindle motor hub of claim 1, wherein the contact area reduction portion defines an indentation in the side wall of the hub body.

6. The spindle motor hub of claim 5, wherein the sectional profile of the indentation is substantially in the shape of a segment of a circle.

7. The spindle motor hub of claim 1, wherein the cylindrical side wall of the hub body has a maximum outer diameter at the contact section and a minimum outer diameter at the non-contact section.

8. The spindle motor hub of claim 1, wherein the hub body has an upper wall, and a bevel extending between the cylindrical side wall and the upper wall.

9. A disk pack of a hard disk drive, comprising:
a spindle motor hub;
at least one disk supported by the spindle motor hub; and
a clamp that clamps the at least one disk to the spindle motor hub,
wherein the spindle motor hub comprises a hub body having a cylindrical side wall whose central longitudinal axis coincides with the axis of rotation for the at least one disk,
the cylindrical side wall having a contact section which confronts the disk and around which the disk extends, and a non-contact section located between the contact section and the upper wall in the axial direction of the cylindrical side wall, the non-contact section including a contact area reduction portion, and wherein an outer diameter of the cylindrical hub body as taken at the contact section is substantially greater than an outer diameter of the hub body as taken at the contact area reduction portion of the non-contact section.

10. The disk pack of claim 9, wherein the spindle motor hub further comprises a flange extending radially outwardly from a lower end portion of the hub body, and the at least one disk is supported by the flange.

11. The disk pack of claim 9, wherein at least two disks are supported by the spindle motor hub, the cylindrical side wall of the hub body has a plurality of contact sections around which the disks extend, respectively, the non-contact section is located between adjacent ones of the contact sections, and outer diameters of the cylindrical hub body as taken at the contact sections are each greater than an outer diameter of the hub body as taken along the contact area reduction portion of the non-contact section.

12. The disk pack of claim 11, further comprising an annular spacer extending around the non-contact section of the cylindrical side wall of the hub body, the spacer being interposed between two of the disks so as to space the disks from one another.

13. The disk pack of claim 11, wherein the non-contact section of the side wall of the hub body spans the adjacent ones of the contact sections of the side wall of the hub body, and the contact area reduction portion extends over the entire non-contact section so as to also span the adjacent ones of the contact sections of the side wall of the hub body, whereby the outers diameter of the side wall of the hub body as taken at the contact sections are each greater than the outer diameter of the cylindrical hub body as taken at any location along the non-contact section of the side wall of the hub body.

14. The disk pack of claim 9, wherein the contact area reduction portion defines an indentation in the side wall of the hub body.

15. The disk pack of claim 14, wherein the sectional profile of the indentation is substantially in the shape of a segment of a circle.

16. The disk pack of claim 9, wherein the cylindrical side wall of the hub body has a maximum outer diameter at the contact section and a minimum outer diameter at the non-contact section.

17. The disk pack of claim 16, wherein each said at least one disk has a through-hole through which the hub body extends, and the maximum diameter of the cylindrical side wall of the hub body is no more than 0.50 mm greater than the diameter of the through-hole such that a gap of no more than 0.25 mm exists between an the contact section and an inner peripheral edge of the disk that defines the through-hole.

18. The disk pack of claim 9, wherein the hub body of the spindle motor hub has an upper wall, and a bevel extending between the cylindrical side wall and the upper wall.

19. The disk pack of claim 9, further comprising a clamp screw fixing the clamp to the spindle motor hub.

20. A hard disk drive (HDD) comprising:
a base;
a head stack assembly (HSA) including a swing arm supported on the base so as to be rotatable about an axis of rotation, and a magnetic head supported by the swing arm;
a voice coil motor (VCM) that rotates the swing arm, the VCM including a voice coil disposed on the rear end portion of the swing arm, and at least one magnet supported on the base and facing the voice coil;
at least one disk; and
a spindle motor that rotates the disk about an axis of rotation, wherein the spindle motor is mounted to the base and includes a spindle motor hub comprising a hub body having a cylindrical side wall whose central longitudinal axis coincides with the axis of rotation of the disk, and an upper wall,
the cylindrical side wall having a contact section which confronts the disk and around which the disk extends, and a non-contact section located between the contact section and the upper wall in the axial direction of the cylindrical side wall, the non-contact section including a contact area reduction portion, and wherein an outer diameter of the cylindrical hub body as taken at the contact section is substantially greater than an outer diameter of the hub body as taken at the contact area reduction portion of the non-contact section.

21. The HDD of claim 20, wherein at least two disks are supported by the spindle motor hub of the spindle motor, the cylindrical side wall of the hub body has a plurality of contact sections around which the disks extend, respectively, the non-contact section is located between adjacent ones of the contact sections, and outer diameters of the cylindrical hub body as taken at the contact sections are each greater than an outer diameter of the hub body as taken along the contact area reduction portion of the non-contact section.

22. The HDD of claim 21, wherein the spindle motor further comprises an annular spacer extending around the non-contact section of the cylindrical side wall of the hub body, the spacer being interposed between two of the disks so as to space the disks from one another.

* * * * *